(12) United States Patent
Houradou et al.

(10) Patent No.: US 8,038,387 B2
(45) Date of Patent: Oct. 18, 2011

(54) BEARING FOR VARIABLE PITCH STATOR VANE

(75) Inventors: Emmanuel Houradou, Paris (FR); Herve Hulin, Tivernon (FR); Sebastien Juste, Saint Fargeau Ponthierry (FR); Dominique Raulin, Ponthierry (FR)

(73) Assignee: SNECMA, Paris (FR)

( * ) Notice: Subject to any disclaimer, the term of this patent is extended or adjusted under 35 U.S.C. 154(b) by 1154 days.

(21) Appl. No.: 11/765,693

(22) Filed: Jun. 20, 2007

(65) Prior Publication Data

US 2008/0031730 A1 Feb. 7, 2008

(30) Foreign Application Priority Data

Jun. 21, 2006 (FR) ...................... 06 52565

(51) Int. Cl.
*F01B 25/02* (2006.01)

(52) U.S. Cl. .................. 415/160; 415/229; 384/215

(58) Field of Classification Search .................. 384/106, 384/215, 220, 221, 222, 265; 415/159, 160
See application file for complete search history.

(56) References Cited

U.S. PATENT DOCUMENTS

| | | | |
|---|---|---|---|
| 2,932,440 A | 4/1960 | Hemsworth | |
| 2,999,630 A | 9/1961 | Warren et al. | |
| 3,788,763 A | 1/1974 | Nickles et al. | |
| 4,050,844 A | 9/1977 | Miller et al. | |
| 5,215,434 A * | 6/1993 | Greune et al. | 415/150 |
| 6,413,043 B1 * | 7/2002 | Bouyer | 415/159 |
| 7,445,427 B2 * | 11/2008 | Gutknecht et al. | 415/160 |
| 7,614,846 B2 * | 11/2009 | Foucher et al. | 415/161 |
| 7,695,194 B2 * | 4/2010 | Bouru | 384/297 |

FOREIGN PATENT DOCUMENTS

| | | |
|---|---|---|
| EP | 2 784 711 | 4/2000 |
| EP | 2 793 521 | 11/2000 |

* cited by examiner

*Primary Examiner* — Edward Look
*Assistant Examiner* — Ryan Ellis
(74) *Attorney, Agent, or Firm* — Oblon, Spivak, McClelland, Maier & Neustadt, L.L.P.

(57) ABSTRACT

A bearing for a turbomachine variable pitch stator vane pivot mounted in a bore of the turbomachine casing is disclosed. The bearing includes an inner bushing secured to the pivot and an outer bushing secured to the bore. An elastomeric material is inserted between the inner bushing and the outer bushing to allow the vane to pivot about its axis and absorb at least some of the flexing of the pivot at right angles to the axis. The design makes it possible to reduce bearing bushing wear.

4 Claims, 3 Drawing Sheets

BEARING FOR VARIABLE PITCH STATOR VANE

BACKGROUND OF THE INVENTION AND DESCRIPTION OF THE PRIOR ART

The present invention relates to the field of turbomachines such as gas turbine engine axial compressors and is aimed in particular at the machine's variable pitch stator vanes.

An articulated system, such as the variable pitch stator vanes of a gas turbine engine compressor, comprises parts which move relative to one another. FIG. 1 schematically depicts a variable pitch stator vane 1 mounted in the machine casing 3. The stator vane comprises an airfoil 12, a mounting plate or platform 13 and a pin forming a pivot 14 at one end. The pivot 14 is housed in a radial orifice or bore formed in the wall of the casing 3 via various bearings. The vane is held only at this end. The other end holds a floating annular element 16 in which it is pivotably mounted via a second pivot 17. The annulus is provided with sealing means to seal against the part of the rotor 18 adjacent to it.

The pivot 14 swivels in the corresponding bore of the casing via bearings, for example a bottom bearing 4 at the platform end. The platform 13 is housed in a cavity in the form of a counterbore machined in the wall of this casing. The wall of the casing is in radial contact with the platform 13 either directly or via a bushing or washer. The top part of the pivot 14 is held in a top bearing 5. The bearings 4 and 5 for example consist of bushings housed in the bore of the casing with an internal ring forming a rubbing surface to rub against the pin 14 that forms the pivot. A friction ring may also be shrunk onto the pin 14.

On the opposite side of the bearing 4 from the platform 13 is the base of the airfoil which is swept by the gases set in motion by the compressor. This face of the mounting plate is shaped to ensure the continuity of the string formed by the casing. A nut 15' holds the vane in its housing and a lever actuated by appropriate control members, rotates the vane about the axis XX of the pin to place this vane in the required position with respect to the direction of the gas flow. The relative movements result from the sliding of surfaces in contact with one another.

In the case of a gas turbine engine axial compressor or alternatively in the case of an axial compressor of air or some other gas on its own, such as a blast furnace compressor or an actual gas compressor, the airfoil 12 is subjected over its entire length to the aerodynamic forces generated by the gas flow. The component of these forces that is directed at right angles to the chord in the intrados-to-extrados direction, generally passing through the axis of the pivot, is the largest component. It will also be noted that, when the vane is highly angled, the component may pass away from this axis. The airfoil is also subjected to axial static pressure forces in the upstream direction because of the pressure difference between the downstream and the upstream sides. The resultant force is illustrated by the arrow F in the figure. It then follows that a moment is applied which combines with the pitch-adjustment rotation about the axis XX over an amplitude which may reach and exceed 40 degrees.

As mentioned above, the bushings that are mounted under the levers of the variable pitch system permit no movement other than rotation about the axis of the pivot. However, because of the transverse forces and the flexing of the stators, the bushings of the prior art are found to exhibit uneven wear. Such wear is detrimental to the correct operation of the variable pitch device.

SUMMARY OF THE INVENTION

The applicant has set himself the object to put in place means for supporting variable pitch vanes of the aforementioned type which are not subject to wear or are less susceptible to wear.

According to the invention, this objective is achieved using a bearing for a turbomachine variable pitch stator vane pivot mounted in a bore of the turbomachine casing, and which comprises an inner bushing secured to said pivot and an outer bushing secured to said bore, an elastomeric material being inserted between the inner bushing and the outer bushing to allow the vane to pivot about its axis and absorb at least some of the flexing of the pivot at right angles to the axis.

By virtue of this design, the bearing operates like a ball joint and makes it possible to increase the effective area between the pivot and the outer bushing. Component wear is thereby reduced.

The bushing structure according to the invention also has the advantage that it can, if necessary, have a damping effect. It is able to dissipate vibrational energy when the stator is subjected to aerodynamic excitation. The vibration modes of the stators are thereby attenuated.

Advantageously, the inner bushing is subdivided into two cylindrical elements at least in the continuation of one another. That allows the inner bushing to adapt to deformations of the pivot. It is possible to increase the number of elements of which the inner bushing is made in order to achieve the best possible compliance.

More specifically, the various elements are separated by an annular layer of elastomer so as to improve sealing along the pivot.

A bearing design such as this is advantageous when applied to the bearing mounted under the vanes operating lever.

BRIEF DESCRIPTION OF THE DRAWINGS

The invention will now be described in greater detail with reference to the attached drawings in which.

DESCRIPTION OF THE PREFERRED EMBODIMENT

Figure 1:
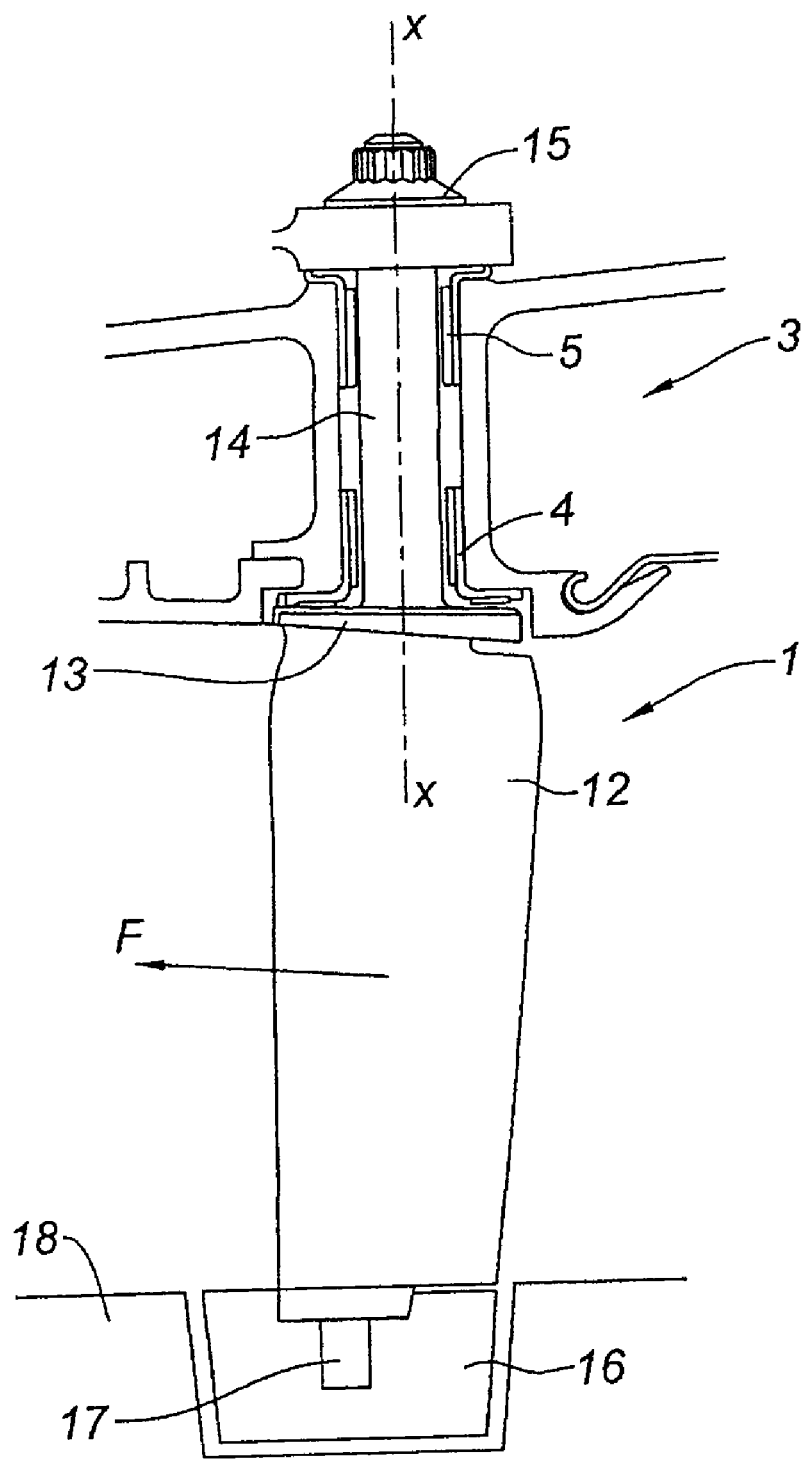
FIG. 1 shows a sectional side view of a variable pitch stator vane mounted in a bore of the casing of a turbomachine according to the prior art.
Figure 2:
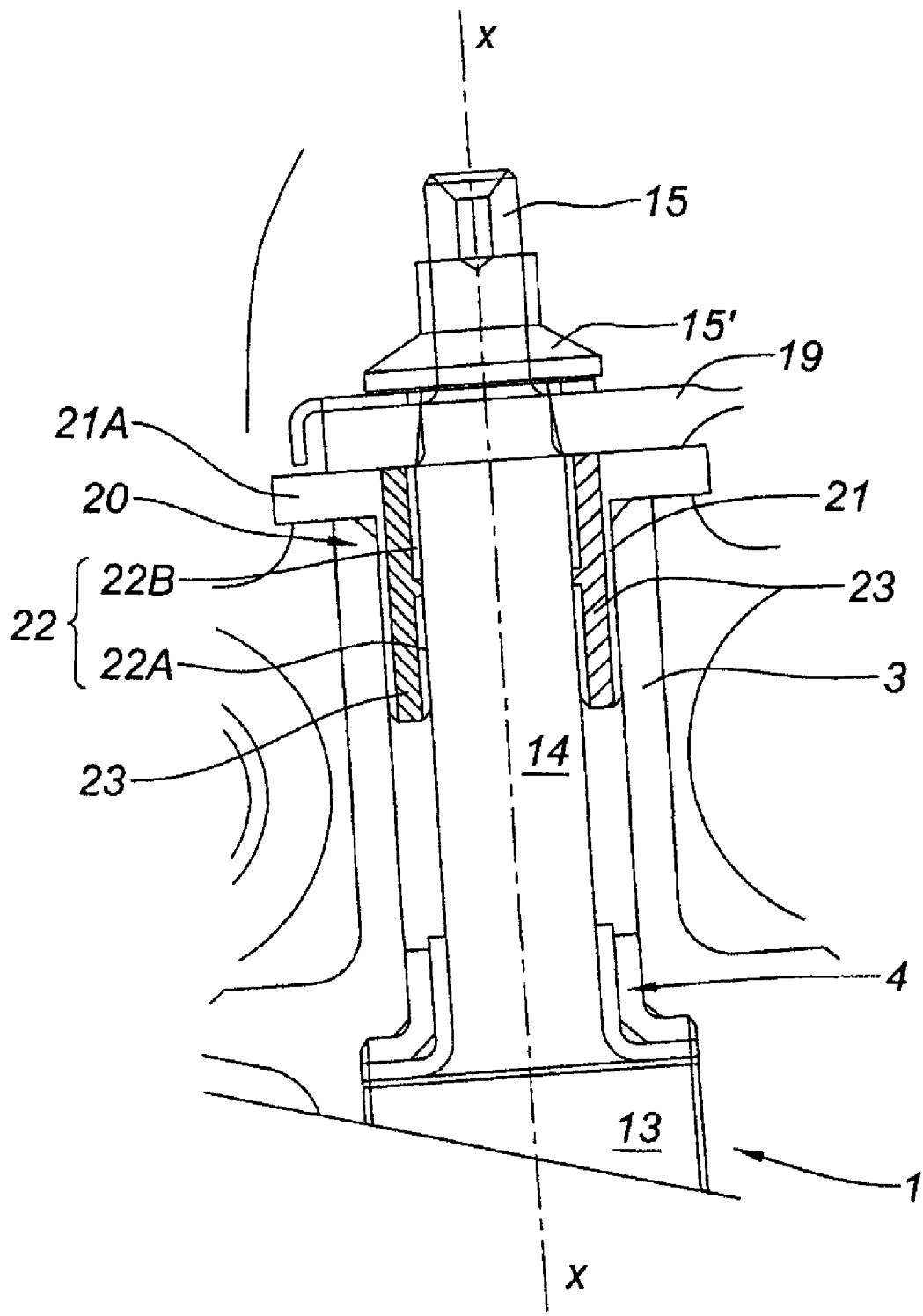
FIG. 2 shows a sectional side view, which is enlarged by comparison with the first one, of the part of the pivot on the control rod side with the layout according to the invention.

FIG. 2 shows the pivot 14 of the vane 1 mounted in the bore of the casing 3 in such a way as to allow it to rotate about the axis XX. The pivot ends in a journal 15 to which a nut 15' secures a rod 19 for rotating the vane about the axis XX.

The pivot is supported by a bearing 4 at the platform 13 end (the airfoil is not depicted) and by a bearing 20 at the rod 19 end. The invention relates to the bearing 20. This is made up of an outer bushing 21 shrunk into the bore of the casing 3. This outer bushing is therefore cylindrical with a transverse flange 21A, resting on the exterior edge of the bore. This flange is inserted between the casing and the rod 19.

An inner bushing 22, made of two cylindrical elements 22A and 22B spaced slightly axially apart from one another, is shrunk onto the pivot 14. This inner bushing extends axially over the same length as the outer bushing 21.

Figure 3:
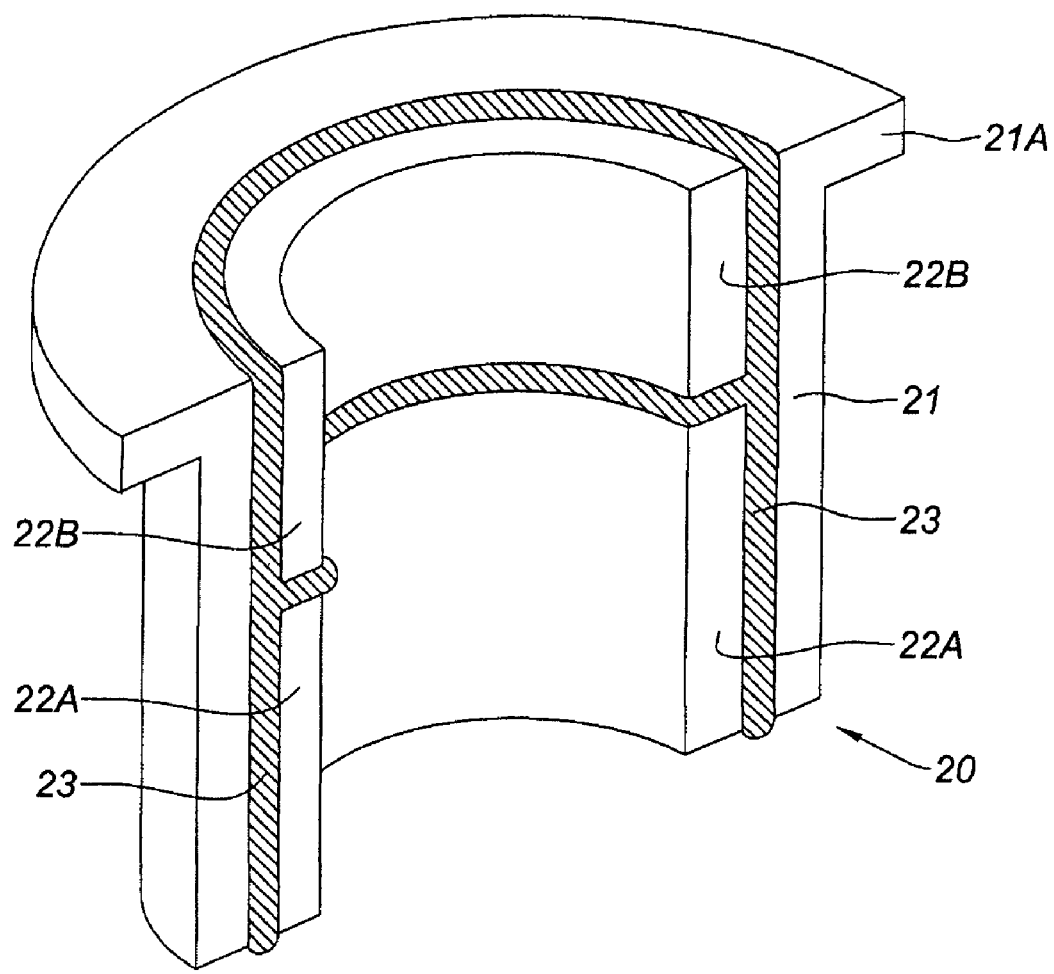
FIG. 3 shows a perspective half section of the bearing according to the invention, by itself.

A space is formed between the two bushings and this space is occupied by an elastomeric material. Advantageously, the material adheres to the two bushings 21 and 22 and occupies the space formed between the two cylindrical elements 22A and 22B. The mutual arrangement of the bushings is shown in greater detail in FIG. 3.

The elastomeric material is chosen in such a way that, as it deforms, it allows one bushing to rotate relative to the other through an angle in both directions, corresponding to the setting of the required pitch for the stator.

The thickness of the elastomeric material is also one of the parameters that must be considered when producing the bearing.

By filling the annular space left between the two bushing elements 22A and 22B, the elastomer contributes to sealing along the surface of the pivot. It will be noted that just two elements have been depicted, although the inner bushing may be made up of a great many elements.

During operation, the elastomeric material follows the rotational movements of the pivot about the axis XX while at the same time ensuring a good seal that also absorbs the forces applied to the pivot in the transverse direction and spreads them over a larger area than would be used if contact between the moving parts were plain and hard.

The bearing according to the invention has been depicted applied to the external support of the pivot, but it could be employed in other areas provided that the environment, particularly the thermal environment, is conducive to this.

The invention claimed is:

1. A bearing for a turbomachine variable pitch stator vane pivot mounted in a bore of the turbomachine casing, comprising:
    an inner bushing secured to said pivot, said inner bushing including a first cylindrical element and a second cylindrical element axially spaced from the first cylindrical element along an axis of the pivot, the first cylindrical element and the second cylindrical element being single piece assemblies;
    an outer bushing secured to said bore, the outer bushing being a single piece assembly; and
    an elastomeric material being inserted between outer diameters of the first and second cylindrical elements of the inner bushing and an inner diameter of the outer bushing and between the first and second cylindrical elements of the inner bushing along the axis of the pivot to allow the vane to pivot about its axis and absorb at least some of the flexing of the pivot at right angles to the axis.

2. A turbomachine stator vane with a pivot intended to be mounted in a bore formed in the turbomachine casing and a journal for attaching to a vane pitch control rod comprising a bearing as claimed in claim 1 positioned at the end of the pivot and the outer bushing of which has a flange.

3. A turbomachine comprising stator vanes with bearings as claimed in claim 1.

4. The bearing as claimed in claim 1, wherein the outer bushing includes a transverse flange.

\* \* \* \* \*